US012609339B2

(12) United States Patent
Han et al.

(10) Patent No.: US 12,609,339 B2
(45) Date of Patent: Apr. 21, 2026

(54) HIGH VOLTAGE-TYPE REDOX FLOW BATTERY COMPRISING SOC BALANCING DEVICE

(71) Applicants: H2, INC., Daejeon (KR); KOREA SOUTH-EAST POWER CO., LTD., Gyeongsangnam-do (KR)

(72) Inventors: Shin Han, Daejeon (KR); Jeehyang Huh, Daejeon (KR); Woo-Yong Kim, Incheon (KR); Chang-Sup Moon, Incheon (KR); Sei Wook Oh, Seoul (KR); Dae Young You, Gyeonggi (KR); Seung Seop Han, Gyeonggi (KR)

(73) Assignee: H2, INC., Daejeon (KR)

( * ) Notice: Subject to any disclaimer, the term of this patent is extended or adjusted under 35 U.S.C. 154(b) by 511 days.

(21) Appl. No.: 18/265,403

(22) PCT Filed: Dec. 29, 2021

(86) PCT No.: PCT/KR2021/020230
§ 371 (c)(1),
(2) Date: Jun. 5, 2023

(87) PCT Pub. No.: WO2022/146059
PCT Pub. Date: Jul. 7, 2022

(65) Prior Publication Data
US 2024/0113316 A1 Apr. 4, 2024

(30) Foreign Application Priority Data
Dec. 29, 2020 (KR) ........................ 10-2020-0185513

(51) Int. Cl.
*H01M 8/04858* (2016.01)
*H01M 8/04082* (2016.01)
(Continued)

(52) U.S. Cl.
CPC ..... *H01M 8/0494* (2013.01); *H01M 8/04201* (2013.01); *H01M 8/04619* (2013.01);
(Continued)

(58) Field of Classification Search
CPC ......... H01M 8/04201; H01M 8/04276; H01M 8/04619; H01M 8/04746; H01M 8/04791;
(Continued)

(56) References Cited

U.S. PATENT DOCUMENTS

2019/0267648 A1* 8/2019 Helmle ............. H01M 8/04477

FOREIGN PATENT DOCUMENTS

JP       2019-530159 A    10/2019
KR      2013-0123098 A    11/2013
(Continued)

OTHER PUBLICATIONS

The foreign reference Nos. 2-6 were cited in the International Search Report dated Apr. 18, 2022 of International Application No. PCT/KR2021/020230.

*Primary Examiner* — Victoria H Lynch
(74) *Attorney, Agent, or Firm* — Cowan, Liebowitz & Latman, P.C.; Anastasia Zhadina

(57) ABSTRACT

The present invention relates to a high voltage-type redox flow battery comprising: a plurality of modules ($100_1$, $100_2$, $100_3$, . . . , $100_n$) which are serially connected; and a battery management system (BMS) for monitoring a state-of-charge (SOC) of each of the plurality of modules ($100_1$, $100_2$, $100_3$, . . . , $100_n$), wherein each of the modules ($100_1$) includes an SOC balancing device comprising a stack ($10$), a positive electrode electrolyte tank ($30a$), a positive electrode pump ($20a$) for providing a positive electrode electrolyte of the positive electrode electrolyte tank ($30a$) to the stack ($10$), a positive electrode inlet pipe ($21a$) connecting the positive electrode electrolyte pump ($20a$) to the stack
(Continued)

(10), a positive electrode outlet pipe (11*a*) connecting the stack (10) to the positive electrode electrolyte tank (30*a*), a positive electrode tank outlet pipe (31*a*) connecting the positive electrode electrolyte tank (30*a*) to the positive electrode electrolyte pump (20*a*), a negative electrode electrolyte tank (30*b*), a negative electrode pump (20*b*) for providing a negative electrode electrolyte of the negative electrode electrolyte tank (30*b*) to the stack (10), a negative electrode inlet pipe (21*b*) connecting the negative electrode electrolyte pump (20*b*) to the stack (10), a negative electrode outlet pipe (11*b*) connecting the stack (10) to the negative electrode electrolyte tank (30*b*), and a negative electrode tank outlet pipe (31*b*) connecting the negative electrode electrolyte tank (30*b*) to the negative electrode electrolyte pump (20*b*).

2 Claims, 3 Drawing Sheets

(51) Int. Cl.

| | | |
|---|---|---|
| *H01M 8/04537* | (2016.01) | |
| *H01M 8/18* | (2006.01) | |
| *H01M 8/249* | (2016.01) | |

(52) U.S. Cl.
CPC ......... *H01M 8/0491* (2013.01); *H01M 8/188* (2013.01); *H01M 8/249* (2013.01)

(58) Field of Classification Search
CPC ......... H01M 8/04828; H01M 8/04858; H01M 8/0491; H01M 8/0494; H01M 8/18; H01M 8/188; H01M 8/249; H02M 3/00; Y02E 60/50
See application file for complete search history.

(56) References Cited

FOREIGN PATENT DOCUMENTS

| | | | |
|---|---|---|---|
| KR | 2014-0132591 | A | 11/2014 |
| KR | 2016-0034535 | A | 3/2016 |
| KR | 2020-0117932 | A | 10/2020 |
| WO | 2016/132414 | A | 8/2016 |

* cited by examiner

[FIG. 1a]
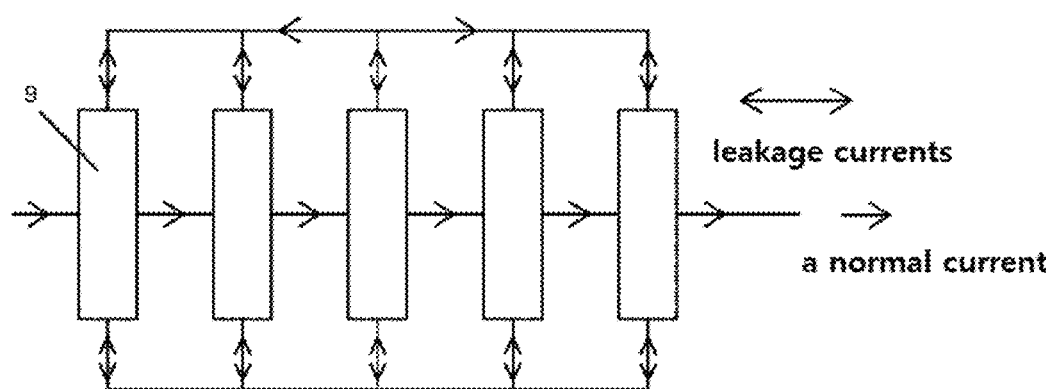
leakage currents
a normal current
[FIG. 1b]
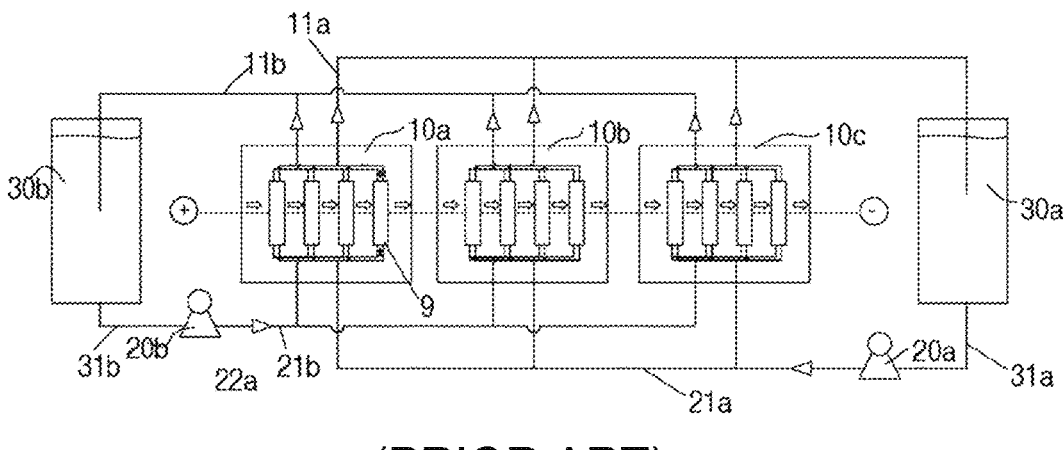
(PRIOR ART)

[FIG. 2]
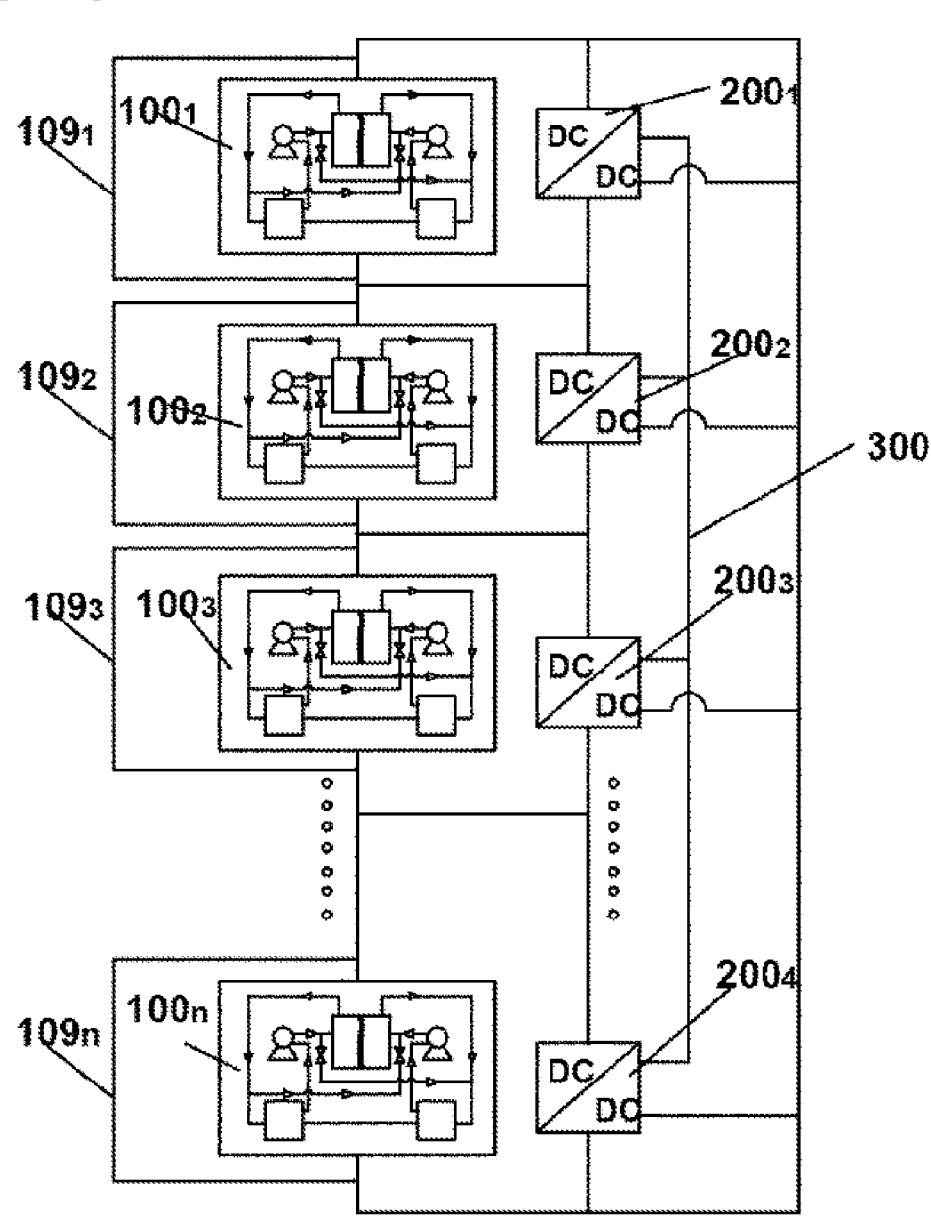

[FIG. 3a]
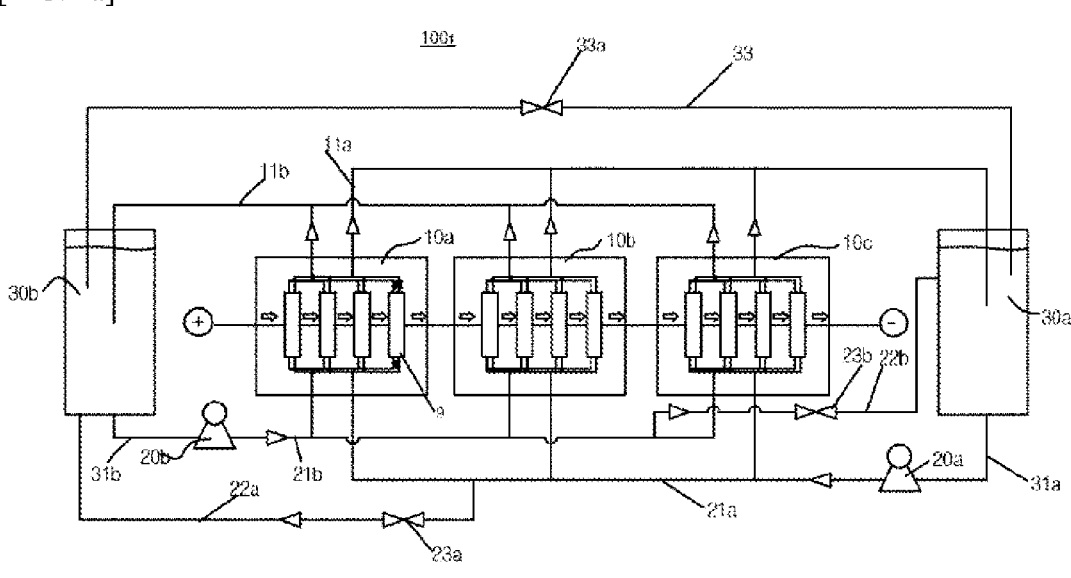
[FIG. 3b]
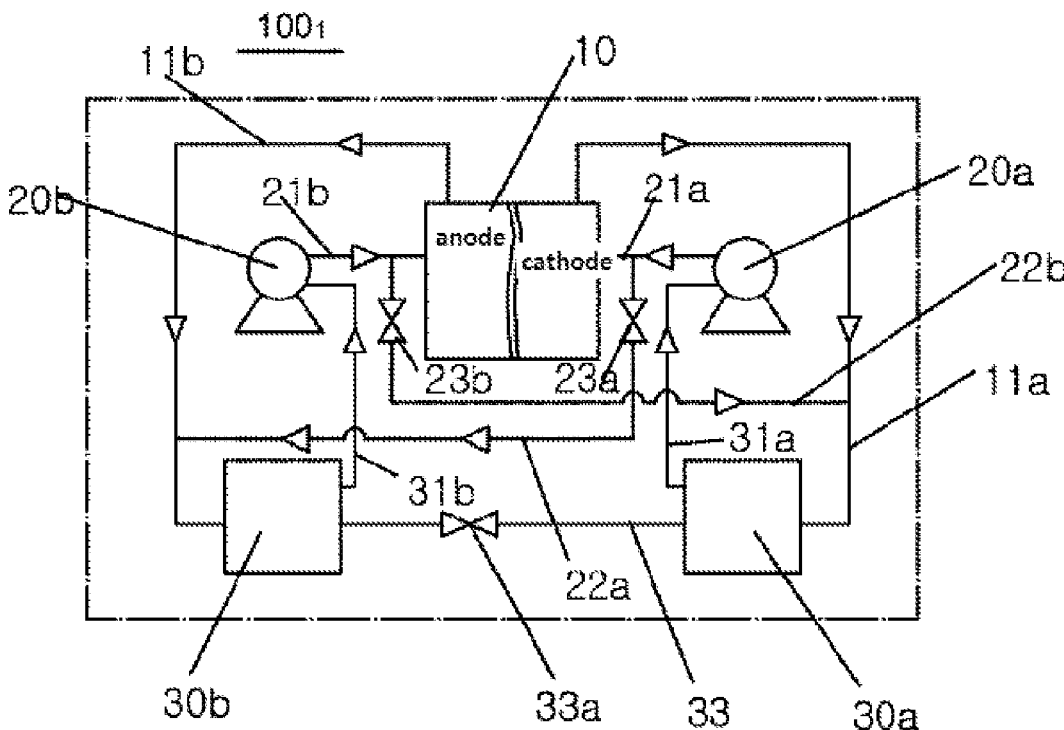

HIGH VOLTAGE-TYPE REDOX FLOW BATTERY COMPRISING SOC BALANCING DEVICE

TECHNICAL FIELD

The present invention relates to a high voltage-type redox flow battery including a SOC balancing device.

BACKGROUND

RFB (redox flow battery) supplies a catholyte stored in a catholyte tank $30a$ to a stack $10$ by a catholyte pump $20a$, and supplies the catholyte in the stack $10$ to the catholyte tank $30a$ through an outlet pipe $11a$ (FIG. 1B).

Likewise, an anolyte stored in an anolyte tank $30b$ is supplied to the stack $10$ by an anolyte pump $20b$, and the anolyte in the stack $10$ is supplied to the anolyte tank $30b$ through an outlet pipe $11b$.

RFB (redox flow battery) has a structure in which electrolytes are stored in separate tanks $30a$, $30b$, and liquid electrolytes stored in the tanks circulate inside cells $9$ which make up the stacks $10a$, $10b$, $10c$ to perform charging and discharging.

At this time, since cells in the stack sharing the same tank are connected by a common flow path and the electrolyte acts as a conductor, an undesired current called a leakage current flows through the electrolyte and loss due to the leakage current is called shunt loss (FIG. 1a).

When the leakage current occurs, problems such as decrease of the current efficiency of the system and occurrence of the voltage deviation between cells are caused. Therefore, it is important to minimize the magnitude of the leakage current in RFB design.

As the voltage difference increases and the resistance of the electrolyte in the flow path decreases, the magnitude of the leakage current increases. That is, the leakage current increases as the number of serially connected cells increases, and a large leakage current occurs as the diameter of the flow path increases and the length decreases.

However, increasing the electrical resistance of the flow path for reducing the leakage current has a disadvantage of increasing the fluid resistance and increasing loss in the pump. Therefore, it is important to seek balance between the leakage current and pump loss in the flow path design.

It is advantageous to reduce the number of serially connected cells in order to reduce the leakage current of RFB. However, in order to connect to a grid, DC 600V or more output voltage must be required to convert DC power into AC power in three-phase 380V. Also, the efficiency of such a power conversion device generally increases as the output voltage increases.

It is very difficult to connect RFB cells in series to generate a high voltage of 600V or more due to the occurrence of the leakage current, and it is generally used a grid connection method of reducing the number of serially connected cells and using DC/DC converters.

However, there is a disadvantage in that system costs increase due to the high price of DC/DC converters with a high boost ratio and system efficiency decreases due to the conversion efficiency of DC/DC converters.

If different modules that do not share an electrolyte are connected in series, there would be no leakage current between the modules and it would be possible to make the system have a high voltage.

However, in this case, a problem of decrease in the discharge capacity occurs because SOCs between the modules cannot be maintained the same.

Patent Publication No. 10-2013-0123098 was disclosed on Nov. 12, 2013 as a patent document related to the present invention.

DETAILED DESCRIPTION OF THE INVENTION

Technical Problem

In the present invention, a plurality of RFB modules $100_1$, $100_2$, $100_3$, . . . , $100_n$ that do not share an electrolyte are connected in series to increase the output voltage so that the power conversion efficiency increases and the cost of the power conversion device decreases.

In addition, in present invention, it is intended to maximize discharge capacity by applying an SOC balancing device optimized for RFB and its operation algorithm, and making SOCs between serially connected modules uniform.

DISCLOSURE

Technical Solution

The present invention relates to a high voltage-type redox flow battery including an SOC balancing device comprising a plurality of serially connected modules ($100_1$, $100_2$, $100_3$, . . . , $100_n$); and a battery management system (BMS) monitoring a state of charge (SOC) of the plurality of modules ($100_1$, $100_2$, $100_3$, . . . , $100_n$), wherein each ($100_1$) of the modules includes a stack ($10$), a catholyte tank ($30a$), a catholyte pump ($20a$) for providing a catholyte of the catholyte tank ($30a$) to the stack ($10$), a catholyte inlet pipe ($21a$) connecting the catholyte pump ($20a$) and the stack ($10$), a catholyte outlet pipe ($11a$) connecting the stack ($10$) and the catholyte tank ($30a$), a catholyte tank outlet pipe ($31a$) connecting the catholyte tank ($30a$) and the catholyte pump ($20a$), an anolyte tank ($30b$), an anolyte pump ($20b$) for providing an anolyte of the anolyte tank ($30b$) to the stack ($10$), an anolyte inlet pipe ($21b$) connecting the anolyte pump ($20b$) and the stack ($10$), an anolyte outlet pipe ($11b$) connecting the stack ($10$) and the anolyte tank ($30b$), and an anolyte tank outlet pipe ($31b$) connecting the anolyte tank ($30b$) and the anolyte pump ($20b$).

Also, in present invention, each of the modules ($100_1$) may include a first connection pipe ($22a$) connecting the catholyte inlet pipe ($21a$) and the anolyte outlet pipe ($11b$), a second connection pipe ($22b$) connecting the anolyte inlet pipe ($21b$) and the catholyte outlet pipe ($11a$), and a third connection pipe ($33$) connecting the catholyte tank ($30a$) and the anolyte tank ($30b$), wherein first to third automatic valves ($23a$, $23b$, $33a$) are installed in the first to third connection pipes ($22a$, $22b$, $33$).

In addition, in present invention, the total number of the plurality of modules must meet conditions of following 1) and 2) conditions,
  1) the lowest voltage of the stack ($10$)×(total number of modules−1)>the lowest convertible voltage of the preset PCS (Power Control System),
  2) the highest voltage of the stack ($10$)×the number of the total modules<the maximum convertible voltage of the preset PCS.

In addition, in present invention, the redox flow battery includes a plurality of DC/DC converters ($200_1$, $200_2$, $200_3$, . . . , $200_n$) connected in parallel with each module, output terminals of the plurality of DC/DC converters ($200_1$, $200_2$, $200_3$, . . . , $200_n$) are connected to a common busbar (300), a battery management system (BMS) monitors SOC of each module in real time during charging and discharging, and a current applied to each module is to satisfy the following equation, $$In=I+I\times dIn$$

In: a current applied to the $n^{th}$ module, I: a system current, dIn: an added or subtracted current Charging: dIn=(SOCavg−SOCn)/SOCavg (SOCavg: average SOC of available modules, SOCn: SOC of $n^{th}$ module)

Discharging: dIn=(SOCn−SOCavg)/SOCavg (SOCavg: average SOC of available modules, SOCn: SOC of $n^{th}$ module)

Advantageous Effects

In the present invention, a plurality of RFB modules $100_1$, $100_2$, $100_3$, . . . , $100_n$ that do not share an electrolyte, are connected in series to increase the output voltage and reduce costs of the power conversion device.

In addition, in the present invention, an SOC balancing device optimized for a plurality of modules of a redox flow battery and an operation algorithm thereof are applied so that SOCs between serially connected modules may be uniform to maximize discharge capacity.

In the present invention, system efficiency increases by improving the conversion efficiency of the power conversion device, and costs are reduced by removing the high-power DC/DC converter.

BRIEF DESCRIPTION OF THE DRAWINGS

FIG. 1A is a diagram illustrating leakage currents in one stack including a plurality of cells 9.

FIG. 1B is a conceptual diagram of one module of a conventional redox flow battery having a plurality of stacks.

FIG. 2 is a redox flow battery configuration diagram of the present invention.

FIG. 3a is a block diagram of a first module $100_1$ according to the present invention.

FIG. 3b is a configuration diagram of a state including a plurality of stacks 10a, 10b, 10c in FIG. 3a.

BEST MODE FOR PERFORMING THE INVENTION

Hereinafter, the present invention will be described in more detail with reference to the accompanying drawings.

The accompanying drawings show an exemplary form of the present invention, which is provided to describe the present invention in more detail, and the technical scope of the present invention is not limited thereto.

In the present invention, a module $100_1$ consisting of a plurality of parallelly connected stacks 10a, 10b, and 10c as shown in FIG. 3b is electrically connected in series as a multiple type ($100_1$, $100_2$, $100_3$, . . . , $100_n$) as shown in FIG. 2.

Since the entire line must be stopped when any one of the modules fails in the serially connected modules, one spare module is included.

The number of serially connected modules including one spare module, is determined to satisfy the following formula.

Lowest voltage of stack×(number of total modules−1) >Lowest convertible voltage of PCS (Power Control System).

Maximum voltage of stack×number of total modules<Convertible maximum voltage of PCS For example, in case that a convertible voltage range of the 380V three-phase PCS is 600-1000V and the minimum/maximum voltage of the stack (output of one module is the same as one stack voltage since stacks are connected in parallel) is 40/60V, it would be desirable that the number of modules is 16 and the output voltage is 640/960V.

In this case, even if one module fails, the total minimum voltage would belong to the convertible voltage range as 600V.

In case that any one module fails or requires maintenance, bypass circuits $109_1$, $109_2$, . . . $109_n$ are included to bypass the module manually or automatically.

The system includes at least one of the following passive balancing and active balancing devices.

In passive balancing as shown in FIG. 3a [simplifying a plurality stacks 10a, 10b, and 10c into one stack 10] and FIG. 3b, each module $100_1$ includes remixing pipes for mixing electrolytes between a cathode and an anode and an automatically controlled valve.

The present invention includes a first connection pipe 22a connecting a catholyte inlet pipe 21a for supplying the catholyte from the catholyte pump 20a to the stack 10 and an anolyte outlet pipe 11b for supplying the anolyte from the stack 10 to the anolyte tank 30b, a second connection pipe 22b connecting an anolyte inlet pipe 21b for supplying the anolyte from the anolyte pump 20b to the stack 10 and a catholyte outlet pipe 11a for supplying the catholyte from the stack 10 to the catholyte tank 30a and a third connection pipe 33 connecting the catholyte tank 30a and the anolyte tank 30b.

In addition, first to third automatic valves 23a, 23b, 33a are installed in the first to third connection pipes 22a, 22b, 33 so that opening and closing can be automatically controlled.

When the first to second automatic valves 23a and 23b are opened, the electrolytes are mixed to different electrodes through the first and second connection pipes 22a and 22b to be discharged and energy is consumed. The amount of discharge may be adjusted by adjusting the opening and closing time of the valve.

The third connection pipe 33 is a water level maintenance pipe to prevent the water level of one tank from rising. Also, a water level sensor may be added in a place such as a tank and a safety device may be added in order to adjust a third automatic valve 33a in case that the sensor senses that the water level of any one tank is higher or lower than a reference.

BMS (battery management system) monitors SOC and stack voltage of each module during charging in a system consisting of serially connected RFB module $100_1$, $100_2$, $100_3$, . . . , $100_n$ and implements passive balancing by opening or closing the first to second automatic valves 23a and 23b of a specific module to perform partial discharge when the SOC or stack voltage of the specific module is higher than a reference.

At this time, the opening and closing timing of the valve can be implemented by using a table obtained through experiments in advance, or monitoring SOC and stack voltages in real time and closing the valve again when the desired value is reached.

Active balancing is implemented in the following method. Each module includes DC/DC converters $200_1$, $200_2$, $200_3, \ldots, 200_n$ connected in parallel with the modules. The output power terminals of DC/DC converters $200_1$, $200_2$, $200_3, \ldots, 200_n$ are connected to a common bus bar 300 and have a structure that can transfer energy of a specific module to another module through the DC/DC converters.

The BMS monitors the SOC of each module in real time during charging and discharging and controls the DC/DC converters such that a current applied to each module is as follows.

$$In=I+I\times dIn$$

In: a current applied to the $n^{th}$ module, I: a system current, dIn: an added or subtracted current Charging: dIn=(SOCavg–SOCn)/SOCavg (SOCavg: average SOC of available modules, SOCn: SOC of $n^{th}$ module)

Discharge: dIn=(SOCn–SOCavg)/SOCavg (SOCavg: average SOC of available modules, SOCn: SOC of $n^{th}$ module)

EXPLANATION OF REFERENCE NUMERALS

| | |
|---|---|
| 9: Cells | 10, 10a, 10b, 10c: Stacks |
| 11a: a catholyte outlet pipe | 11b: an anolyte outlet pipe |
| 20a: a catholyte pump | 20b: an anolyte pump |
| 21a: a catholyte inlet pipe | 21b: an anolyte inlet pipe |
| 30a: a catholyte tank | 30b: an anolyte tank |
| 31a: a catholyte tank outlet pipe | 31b: an anolyte tank outlet pipe |

It will be obvious to those of ordinary skill in the art to which the present invention belongs that the present invention is not limited by the above-described embodiments and accompanying drawings, but can be replaced, added, and changed without departing from the technical idea of the present invention.

The invention claimed is:

1. A high voltage-type redox flow battery including an SOC balancing device comprising a plurality of serially connected modules ($100_1$, $100_2$, $100_3, \ldots, 100_n$);

a battery management system (BMS) monitoring a state of charge (SOC) of the plurality of modules ($100_1$, $100_2$, $100_3, \ldots, 100_n$); and a plurality of DC/DC converters ($200_1$, $200_2$, $200_3, \ldots, 200_n$) connected in parallel with each of the plurality of modules, wherein each ($100_1$) of the plurality of modules includes a stack (10), a catholyte tank (30a), a catholyte pump (20a) for providing a catholyte of the catholyte tank (30a) to the stack (10), a catholyte inlet pipe (21a) connecting the catholyte pump (20a) and the stack (10), a catholyte outlet pipe (11a) connecting the stack (10)

and the catholyte tank (30a), a catholyte tank outlet pipe (31a) connecting the catholyte tank (30a) and the catholyte pump (20a), an anolyte tank (30b), an anolyte pump (20b) for providing an anolyte of the anolyte tank (30b) to the stack (10), an anolyte inlet pipe (21b) connecting the anolyte pump (20b) and the stack (10), an anolyte outlet pipe (11b) connecting the stack (10) and the anolyte tank (30b), and an anolyte tank outlet pipe (31b) connecting the anolyte tank (30b) and the anolyte pump (20b), wherein total number of the plurality of modules must meet following 1) and 2) conditions 1) The lowest voltage of the stack (10)×(total number of modules–1)>the lowest convertible voltage of a preset PCS (Power Control System), 2) The highest voltage of the stack (10)×the total number of the total modules<the maximum convertible voltage of the preset PCS, wherein the plurality of modules ($100_1$, $100_2$, $100_3, \ldots, 100_n$) are manually or automatically connected to bypass circuits ($109_1$, $109_2, \ldots 109_n$) so that in case that a module has a problem, only the other of the plurality of modules without the problematic module can be connected in series, wherein output terminals of the plurality of DC/DC converters ($200_1$, $200_2$, $200_3, \ldots, 200_n$) are connected to a common busbar (300), and wherein the battery management system (BMS) monitors the SOC of each module in real time during charging and discharging, and a current applied to each module is to satisfy the following equations $$In=I+I\times dIn$$

(In: a current applied to the $n^{th}$ module, I: a system current, dIn: an added or subtracted current)

Charging: dIn=(SOCavg–SOCn)/SOCavg (SOCavg: average SOC of available modules, SOCn: SOC of $n^{th}$ module)

Discharging: dIn=(SOCn–SOCavg)/SOCavg (SOCavg: average SOC of available modules, SOCn: SOC of $n^{th}$ module).

2. A high voltage-type redox flow battery including an SOC balancing device of claim 1, wherein each ($100_1$) of the plurality of modules comprises a first connection pipe (22a) connecting the catholyte inlet pipe (21a) and the anolyte outlet pipe (11b), a second connection pipe (22b) connecting the anolyte inlet pipe (21b) and the catholyte outlet pipe (11a), and a third connection pipe (33) connecting the catholyte tank (30a) and the anolyte tank (30b), wherein first to third automatic valves (23a, 23b, 33a) are installed in the first to third connection pipes (22a, 22b, 33).

* * * * *